Patented Nov. 4, 1941

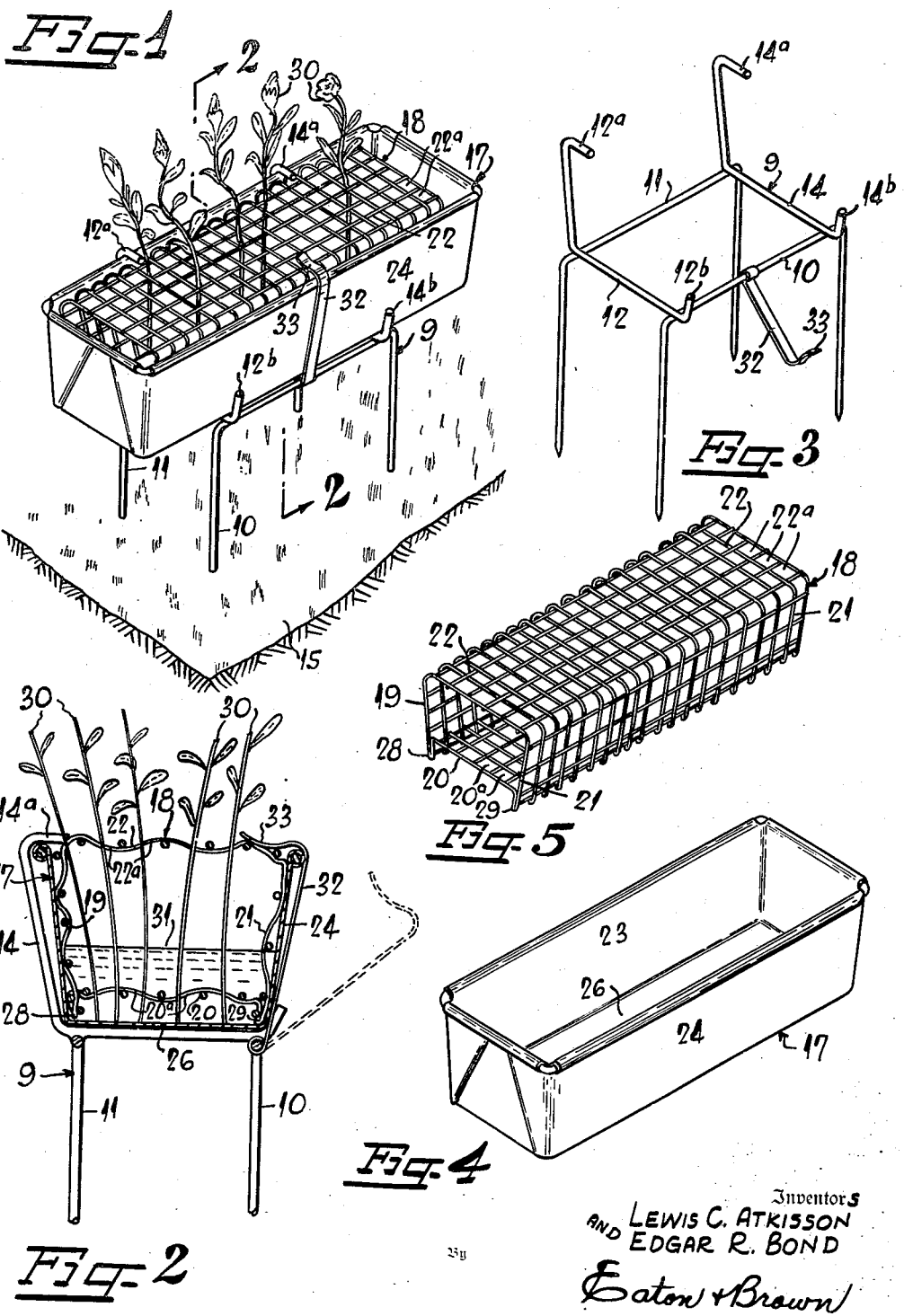

2,261,326

UNITED STATES PATENT OFFICE 2,261,326

FLOWER CONTAINER AND SUPPORT THEREFOR

Lewis C. Atkisson and Edgar R. Bond, Greensboro, N. C.

Application August 16, 1940, Serial No. 352,948

3 Claims. (Cl. 47—41)

This invention relates to a plant holder and support therefor and more especially to an article for holding flowers, ferns and the like in position to produce the proper ornamental effect. The present invention is particularly adapted for outdoor use such as for grave decoration where it is often desirable to place flowers or plants from time to time. Under such circumstances, it is desirable to have a holder in which the decorating plants can be easily inserted and removed and which will supply them with sufficient moisture to prevent undue wilting.

It is an object of this invention to provide a plant or flower holder of the class described, comprising a container having two spaced horizontal wire mesh layers, removably inserted therein. One of the layers is adapted to support each plant at its lower end and the other layer is adapted to support each plant at a point substantially removed from the bottom, so that the plant will be held in an upright position. This type of construction permits flowers, plants or other decorative material to be easily arranged to produce a desired ornamental effect, because the wire mesh layers hold the plants or materials in the position in which they are placed.

Another decided advantage in the wire mesh construction is the removability feature. In the present instance, the wire layers are connected to each other to form a rack unit, thereby making it possible for the decorator to place all of the plants or flowers in the rack, and then bodily place them in the container. This also permits easy cleaning of the container.

It is another object of this invention to provide a container having a removable wire mesh unit therein together with a support therefor, said support having hooked means and also a latching means for holding the container on the support and for holding the wire mesh unit in the container.

Some of the objects of the invention having been stated, other objects will appear as the description proceeds, when taken in connection with the accompanying drawing, in which—

Figure 1 is an isometric view showing the support, the container and the rack as they appear when in use;

Figure 2 is a transverse vertical sectional view taken along the line 2—2 in Figure 1;

Figure 3 is an isometric view of the support for the container;

Figure 4 is an isometric view of the container;

Figure 5 is an isometric view of the removable wire mesh rack which is adapted to fit in the container.

Referring more specifically to the drawing, the numeral 9 denotes a support comprising suitable inverted U-shaped wires 10 and 11 to which are attached by any suitable means such as welding or the like, wire container supports 12 and 14. The lower ends of the U-shaped members 10 and 11 are preferably sharpened, so as to be easily insertable in the ground 15, when the plant holder is used for outdoor decoration. The members 12 and 14 are shaped to conform to the exterior cross section of a suitable container 17 which is adapted to rest upon these members. This container may be removed from or inserted upon the members 12 and 14, and when thus removed or inserted, the ends 12a, 12b, 14a and 14b, serve to confine the container in position.

A suitable wire mesh rack 18 is adapted to be removably inserted within the container 17. This wire mesh rack is endless in cross section and has sides 19, 20, 21 and 22. When the rack is inserted in the container, side 19 of the rack 18 is adapted to be disposed in substantially parallel relation to the side 23 of the container; the side 21 of the rack is adapted to be disposed in substantially parallel relation to side 24 of the container; and the sides 20 and 22 of the rack are adapted to be disposed substantially parallel to the bottom 26 of the container.

It will also be noted that the lower side 20 of the rack 18 is held a substantial distance above the bottom 26 of the container by means of suitable legs 28 and 29. When the rack is positioned in the container in the manner shown in Figures 1 and 2, plants or flowers 30 are adapted to penetrate openings 22a in the upper side or layer 22 and also the openings 20a in the lower side or layer 20. The lower end of the plant or flower stem normally rests upon the bottom 26 of the container. Due to the close spacing of the wire mesh openings 20a and 22a, it is seen that the stems of the flowers or plants 30 can be placed in almost any position that one might choose, thereby making it possible to decorate or to provide any suitable ornamentation with ease. If desired, the rack can be removed, the flowers inserted therein, and then the rack and flowers again inserted in the container. Usually, a suitable supply of water 31 is provided in the container to prevent undue wilting of the flowers.

A very simple and efficient latching means is provided whereby the container 17 will be held upon the holder 9, and at the same time the wire mesh rack 18 will be held within the container by the same latching means. This latching means comprises an L-shaped member 32 which is pivotally mounted around the horizontal portion of U-shaped member 10. The upper end of member 32 has a spring lip 33 which is adapted to fit over the upper rim of the container 17 and also above the rack 18, when the flower support is in position for use as shown in Figures 1 and 2. The latch 32 is shown in a disengaged position in Figure 3 and is also shown in disengaged position in dotted lines in Figure 2. The hooked portions 12a and 14a also engage both the upper edge of the container and the upper surface of the wire-mesh member 18.

In the drawing and specification, there has been set forth a preferred embodiment of the invention and although specific terms are employed, they are used in a generic and descriptive sense only and not for purposes of limitation, the scope of the invention being set forth in the appended claim.

We claim:

1. Apparatus for displaying flowers and the like, and holding them in substantially vertical position, comprising a container, a pair of spaced horizontally disposed perforated members removably mounted in the container whereby an inserted flower will penetrate a perforation in each member and be held in upright position, a support for said container having a pair of hooks for engaging one edge of the container, and a single latch for engaging the other side of the container for holding the container on the support and for holding the perforated members in the container.

2. Apparatus for displaying flowers and the like comprising a rectangular container and a wire mesh rack endless in cross section, removably mounted in said container and having its sides substantially parallel to the container sides and bottom, the sides of the rack which are parallel to the container bottom being spaced apart from each other and being substantially removed from the bottom whereby the flowers may penetrate two parallel mesh sides and be held in upright position, a support for the container and means carried by the support for engaging the upper surfaces of the container and rack for holding the container, the rack and the support together.

3. Apparatus for displaying flowers and the like comprising a container rectangular in plan and a wire mesh rack endless in cross section, removably mounted in said container and having its sides substantially parallel to the container sides and bottom, the sides of said rack which are parallel to the container bottom being spaced apart from each other and being substantially removed from the container bottom whereby the flowers may penetrate the parallel mesh sides and be held in upright position, a support for the container, a pair of hooks carried by the support for engaging one upper edge of the container and rack, and a latch carried by said support for engaging the other side of the container and rack for holding the container on the support and for also holding the rack in the container.

LEWIS C. ATKISSON.
EDGAR R. BOND.